June 7, 1960 H. SCHÖENFELDER ET AL 2,939,765
METHOD FOR REDUCING THE SILICA CONTENT OF ALUMINA
CONTAINING MATERIALS OF THE BAUXITE TYPE
Filed March 7, 1958 4 Sheets-Sheet 4
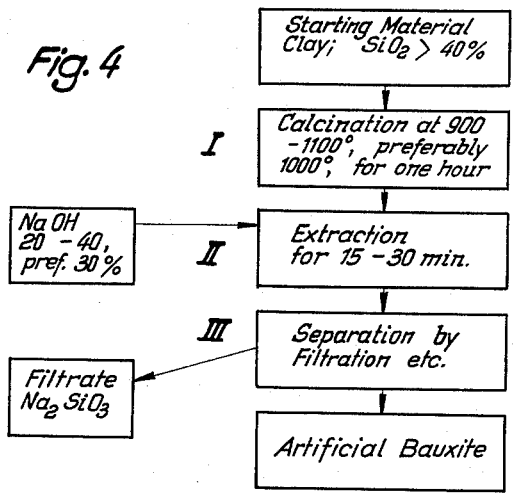
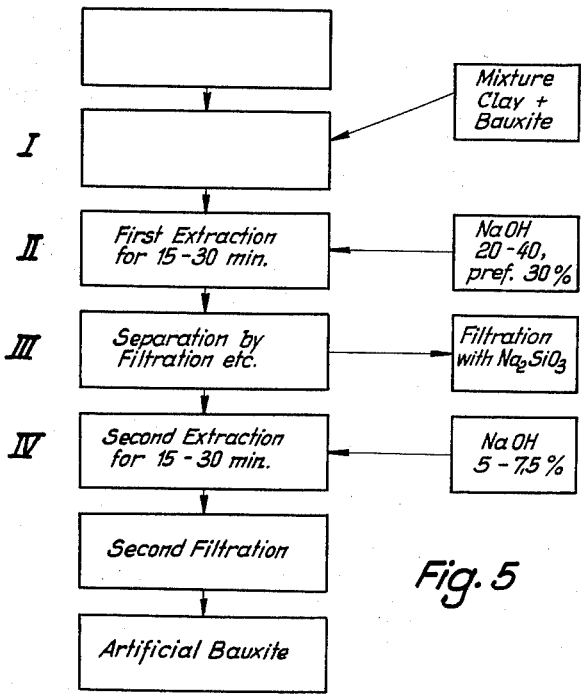
Inventors
HERBERT SCHOENFELDER
HANS GINSBERG
BY: Toulmin & Toulmin
ATTORNEYS

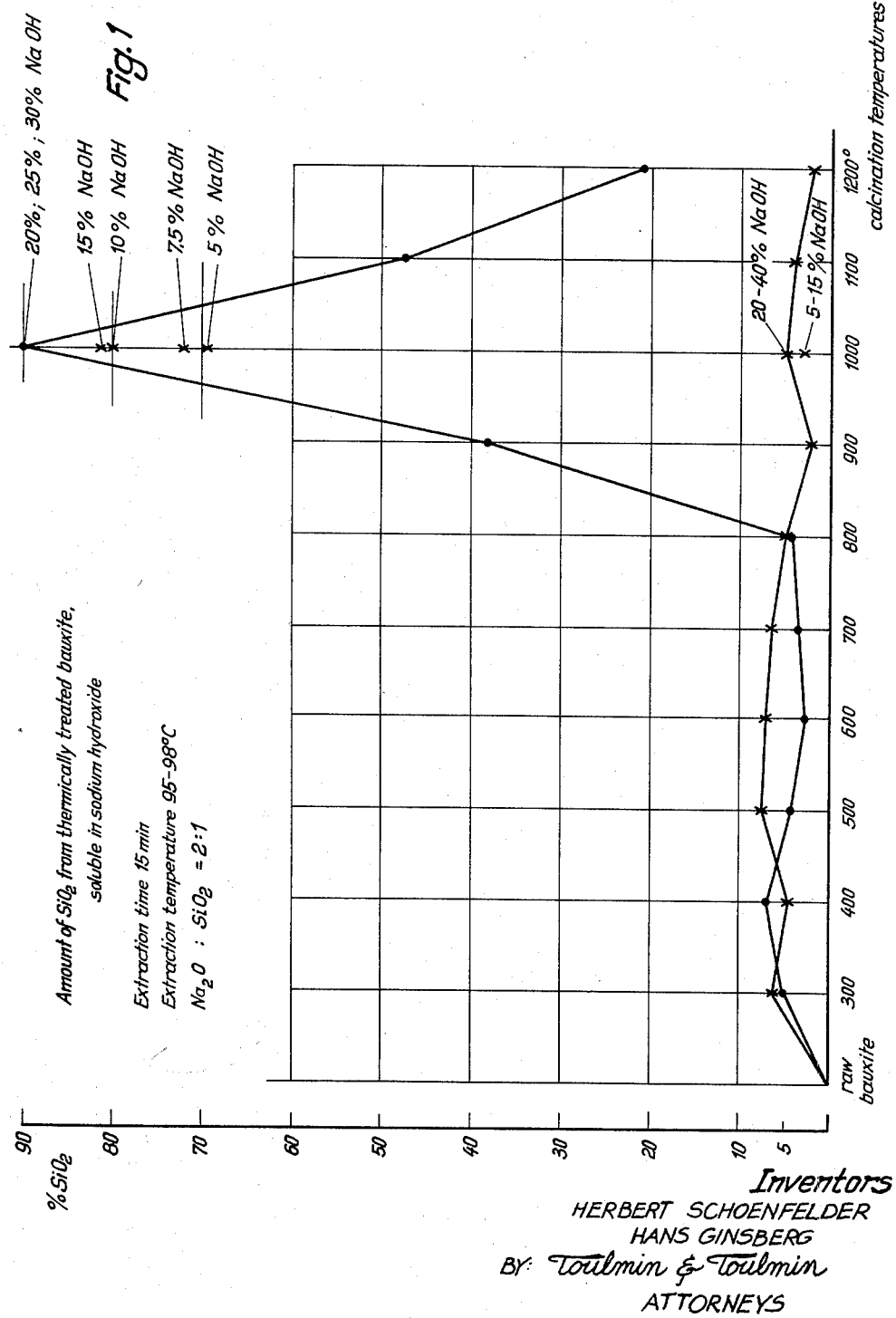

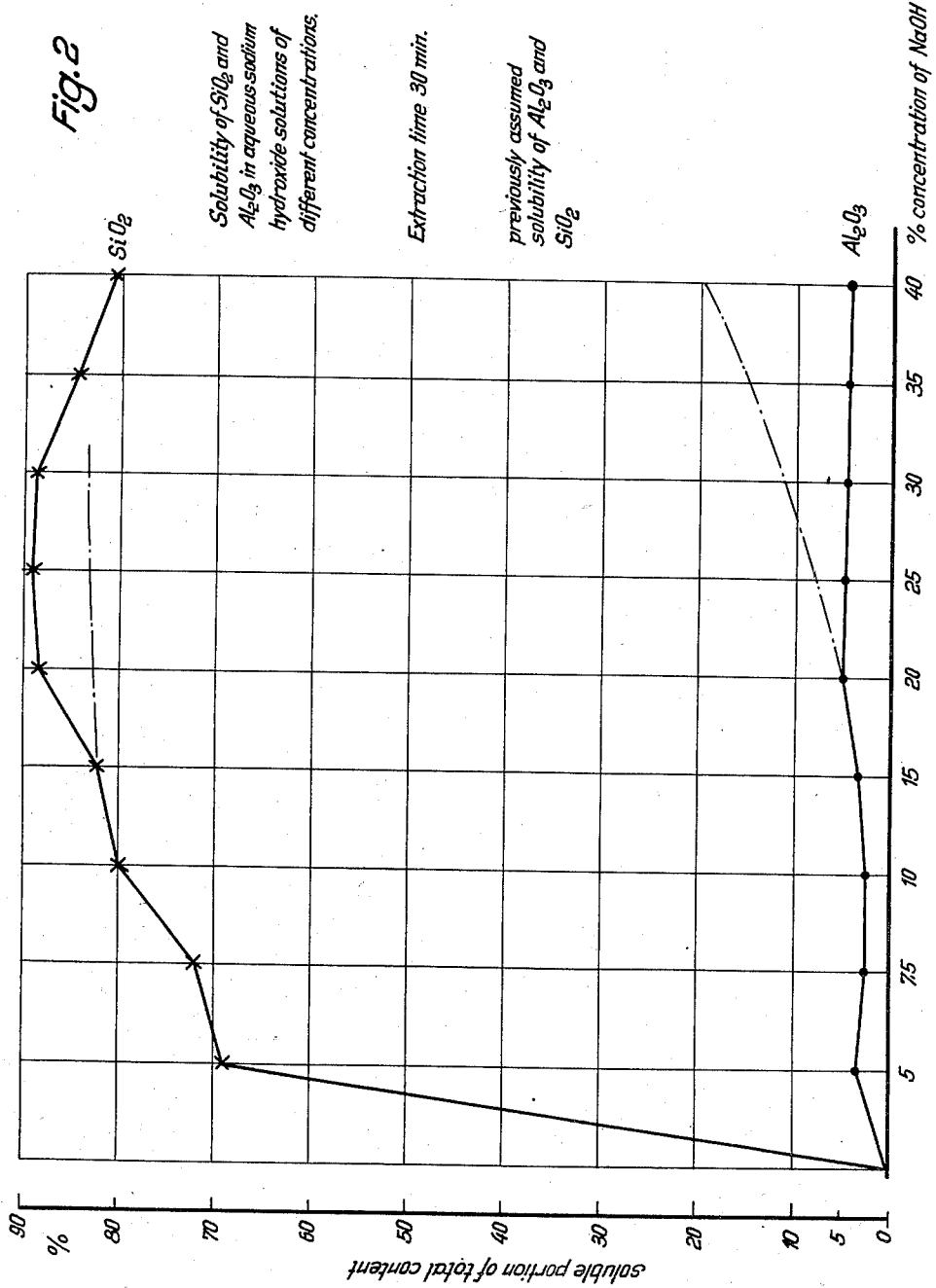

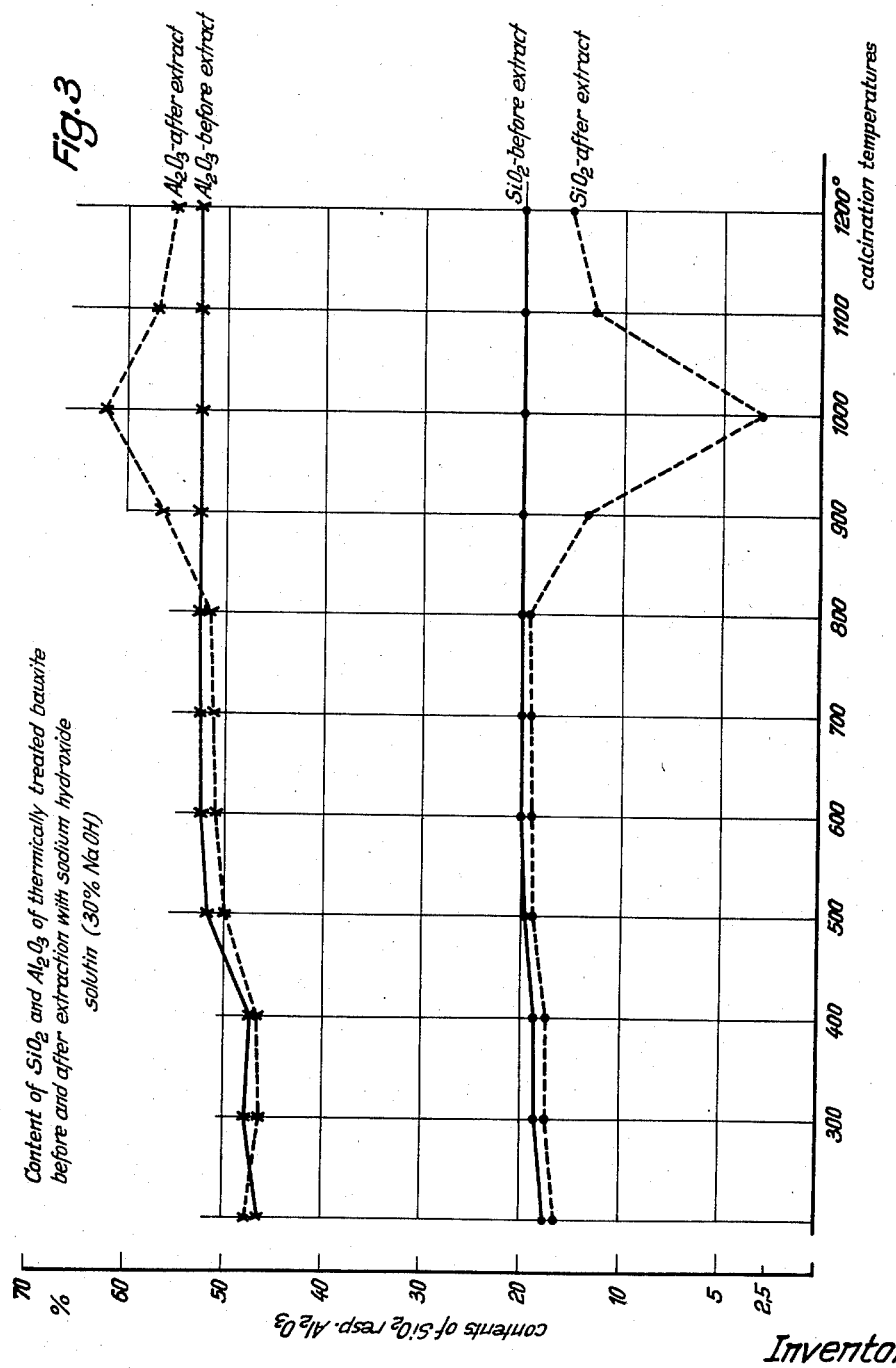

United States Patent Office 2,939,765
Patented June 7, 1960

2,939,765

METHOD FOR REDUCING THE SILICA CONTENT OF ALUMINA CONTAINING MATERIALS OF THE BAUXITE TYPE

Herbert Schoenfelder, Bonn, and Hans Ginsberg, Bad Godesberg, Germany, assignors to Vereinigte Aluminium-Werke, Aktiengesellschaft, Bonn, Germany Filed Mar. 7, 1958, Ser. No. 719,811

4 Claims. (Cl. 23—143)

This invention relates to a method of decomposing alumina containing substances having high silicic acid contents; it relates more particularly to a method of enriching the alumina content and decreasing the silica content of certain bauxites having an $SiO_2$ content higher than 10%.

This application is a continuation-in-part of the pending application Serial No. 464,884, filed on October 26, 1954, and now abandoned.

In the decomposition of substances containing alumina, use is frequently made of the so-called "lime-soda" process, in which the silicic acid present in the starting material is intended to be converted by sintering with lime into calcium silicate, while the alumina is converted by soda ($Na_2CO_3$) into soluble aluminate which is subsequently recovered by leaching out the sintered product and processing the resulting solution to obtain alumina hydrate ($Al_2O_3 \cdot H_2O$, $Al_2O_3 \cdot 2H_2O$, $Al_2O_3 \cdot 3H_2O$). However, in this known process as well as in the Bayer process, a high silicic acid content in the starting materials must be avoided, since, otherwise, there is danger that a part of the alkali (Na, K ions) will be lost for the formation of alkali metal aluminate, and be instead used up for the formation of alkali metal silicates.

A great number of methods have been proposed in the art for reducing the silicic acid content of the starting materials prior to using them as a first step of preparing suitable starting materials in the above-mentioned processes for the decomposition of alumina containing materials. These methods frequently employ a preliminary treatment of the starting materials by heat treatment at elevated temperatures, and subsequent leaching with caustic soda (sodium hydroxide) solutions or soda (sodium carbonate) solutions.

Neither of these known methods is applicable to bauxites having a silicic acid content higher than 10%.

When speaking of silica or silicic acid or $SiO_2$ content, this is to be understood as meaning that silicon is present bonded to oxygen in these materials in an amount which, in conventional quantitative chemical analysis, would be calculated as a percent of $SiO_2$.

When speaking of alumina in the specification and claims, it is to be understood that "alumina" refers not only to the anhydrous aluminum oxide, but it also refers to its hydrated forms, such as the trihydroxide and oxide hydroxide of aluminum. It is also to be understood that bauxite type ores have an aluminum content essentially in the form of alumina.

It is, therefore, an object of our invention to provide a method for the production of alumina enriched materials to be used as starting materials for decomposition processes of the above-mentioned types leading to the production of alumina hydrates, which method permits to increase the alumina content of bauxites having an $SiO_2$ content above 10% so as to obtain an enriched product containing about 50% and more of $Al_2O_3$ and an $SiO_2$ content which has been reduced below 10% and is preferably in the order of 5% or less and generally only one fifth of the original $SiO_2$ content.

This object is attained by the method according to the invention which is based on our discovery that due to rather involved chemical reactions constituting a thermic cleavage and recrystallization of the treated materials, calcination of the same at temperatures above 800° C. and up to 1100° C. leads to the conversion of a high proportion of the total $SiO_2$ content into a form soluble in relatively concentrated alkaline solutions.

We have also found that when calcining alumina containing materials of $SiO_2$ contents above 10% at higher temperatures (800–1100° C.) the ratio of soluble silica to soluble alumina is greatly improved, i.e. a considerably higher rate of increase in silicic acid solubility is accompanied by a considerably lower rate of increase in the solubility of alumina.

We have further found that the solubility rate of alumina does not further increase but remains stationary or even slightly decreases when extraction of the bauxites having a high silicic acid (above 10%) content which have been precalcined at 900° to 1100° C. and preferably at 1000° C., is carried out with sodium hydroxide solutions having an NaOH content above 20% and at a temperature between about 70° C. and the boiling temperature of the NaOH solutions, preferably at 100° C., and for a relatively short time of 15 to 30 minutes. We further found that the proportion of the silicic acid content of the bauxites, that can be removed with such sodium hydroxide solutions of higher concentration has a maximum range when the solutions have an NaOH content between 20 and about 35 to 40%.

The nature of our discovery and the method according to the invention shall be illustrated hereinafter with the aid of a number of graphs and flowsheets contained in the accompanying drawings, in which:

Figure 1 is a graph illustrating the proportions of silica and alumina contents of bauxites having an $SiO_2$ content above 10%, dependent upon the calcination temperature applied.

Figure 2 is a graph showing the solubility rate of the $SiO_2$ and $Al_2O_3$ of a bauxite having a $SiO_2$ content higher than 10% and calcined to about 1000° C. as a function of the NaOH concentration of the extraction agent.

Figure 3 illustrates in a graph the proportions of the $SiO_2$ and $Al_2O_3$ contents of a bauxite having an $SiO_2$ content above 10%, before and after calcination at different temperatures and subsequent extraction according to the process of the invention.

Figure 4 is a flowsheet illustrating the steps of carrying out the method according to the invention.

Figure 5 is a flowsheet illustrating another mode of carrying out the method according to the invention.

The method according to the invention shall now be described in detail with the aid of the flowsheet of Fig. 4.

Suitable starting materials for the process according to the invention are bauxites having a $SiO_2$ content higher than 10%.

A bauxite starting material or a mixture of several bauxites is first treated, according to step I, as illustrated in the flowsheet of Figure 4, by calcination in a conventional furnace at temperatures between 900 and 1100° C., and preferably at about 1000° C.

We have found it to be of advantage to restrict the calcination step to about one hour. We have also found that calcination at about 1000° C. for about one hour is sufficient to achieve a complete thermic cleavage and recrystallizations in the treated material so as to achieve the maximum attainable rate of conversion from difficultly soluble or insoluble silicic acid contained in the bauxite to a type of $SiO_2$ compounds which are easily soluble in the alkaline extraction agent according to the invention.

In this case, it is possible to convert about 90% of the total $SiO_2$ content to the soluble form, while only about 5% of the $Al_2O_3$ present in the bauxite become soluble, i.e. the ratio between the soluble shares of $SiO_2:Al_2O_3$ is 18:1.

At temperatures below 1000° C. and in particular 900° C., the conversion of $SiO_2$ is incomplete, as will be seen from the graph of Figure 1.

It is also clear from this graph that, when calcining the bauxite starting materials according to the invention, the upper temperature limit is also critical, and that already at about 1100° C. and still more at higher temperatures, the conversion rate of the $SiO_2$ content to the soluble form decreases rapidly.

Our above-mentioned discovery that this conversion, when taking place at 1000° C. is already complete after about one hour, is of great economical importance. Furthermore, if the time of calcination should be excessively prolonged, this would also lead to a decrease in the amount of silicic acid converted to soluble $SiO_2$.

Subsequent to calcination, the calcined bauxite material is then subjected to the second step (II) of the method according to the invention, which step consists in extracting the calcined material after an easily achieved disintegration, with an aqueous sodium hydroxide solution containing between 20 and 35 to 40, and preferably about 30% NaOH.

Figure 2 illustrates this step of the method, and shows in particular that, in accordance with our discovery, the solubility of the alumina in the calcined material remains surprisingly enough rather constant and below about 8% and appears to be independent of changes in the concentration of the extracting agent above an NaOH content of 15% after an initial doubling of the alumina solubility rate with an increase of the NaOH content in the extraction agent from 7.5 to 15%. Figure 2 further illustrates our discovery that a maximum removal of soluble $SiO_2$ from the calcined bauxite can be achieved with a sodium hydroxide solution containing about 30% of NaOH. In order to achieve these results, the sodium hydroxide solution should have a temperature between about 70° C. and the boiling temperature, preferably about 100° C., and the time of extraction should be limited to about 15 to 30 minutes.

It is essential in carrying out this step of the method invented by us, that the time of treatment of the bauxites having a high silicic acid content should only be very short and as a rule within the above stated time limits, since we found that in this manner it is possible to dissolve the maximum possible amount of silicic acid, but only a small amount of alumina. We have found that the extraction of silicic acid takes place at a greater speed than that of alumina and is practically complete, if carried out with the sodium hydroxide solution of the above mentioned optimal concentration and within the specified time limit, while only a small amount of alumina not exceeding 8% may become dissolved.

The improved process according to the invention thus overcomes the objections raised by those versed in the art to the use of higher concentrations of caustic soda solution for the removal of silicic acid from materials having a high silicic acid content.

As the next following step (III) in the method according to the invention, the extracted calcinate product is then separated by filtration in a conventional manner from the sodium-silicate containing extraction lye.

According to a preferred mode of operation illustrated in the flowsheet of Figure 5, the extracted and filtered calcinate residue is subjected to a second extraction and washing step (IV) with a more dilute aqueous sodium hydroxide solution having a concentration not exceeding 10% and preferably between 5 and 7.5% of NaOH under the same conditions of temperature and time as the first extraction step. No excess pressures are required throughout the process.

By the various process steps described hereinbefore, it is possible to remove about four fifths of the initial $SiO_2$ contents from bauxites having a high silicic acid content above 10%, while normally less than 8% and maximally 10 to 15% of the alumina initially contained in the bauxite, is dissolved.

The amounts of alkali metal hydroxide (caustic soda, or caustic potash, although the use of the latter will hardly ever be practical for economic reasons) needed for the two extraction stages are about 0.5 to 10 moles of $Na_2O$ for each mole of $SiO_2$; a molar ratio of about 1:2 is preferred. However, a higher rate of alkali would be excessive and reduce the economy of the process.

A further feature of the invention consists in treating the lye having a high sodium silicate content and produced in the first, or the first and second extraction step of the process, and then separated by the filtration step or steps, with lime and/or magnesia or their hydrates, thereby freeing the lye from silica and re-causticifying it, whereupon the lye may be recycled to the extraction steps.

The final product may be termed an "artificial bauxite" for it contains an $SiO_2$ content of 2 to 8% and even less, while its alumina content exceeds 50 and often 60%.

Figure 3 shows a graph illustrating the conversion of a bauxite having an initial $SiO_2$ content of about 17% and an initial $Al_2O_3$ content of about 46% to an "artificial bauxite" having an $SiO_2$ content of about 2.6% and an $Al_2O_3$ content of 62%.

All percentages in this application are given by weight. Correspondingly, the increase in the percentages of both $SiO_2$ and $Al_2O_3$ during the calcination step are due to the loss of water from bauxite, and at the higher temperatures also due to evaporation of other impurities ($CO_2$ from carbonates etc.).

The invention will be further illustrated by a number of examples given below which are, however, not meant to be limitative in any way.

EXAMPLE I

A bauxite containing 20.5% $SiO_2$ and 49.1% of $Al_2O_3$ is heated to 1000° C. for one hour and subsequently extracted whilst stirring or circulating with a 30% solution of NaOH of a temperature of about 100° C. for a quarter of an hour. The sodium silicate solution produced is filtered off and after regeneration returned to the purification process. The residue obtained contains approximately 7.1% $SiO_2$ and 56.2% of $Al_2O_3$. If this residue is after-washed with a 5% NaOH solution under similar conditions, a product is obtained which contains 5.7% of $SiO_2$ and 57% of $Al_2O_3$. In the normal Bayer process it is possible with this refined bauxite to obtain a yield of 92% of the alumina introduced.

EXAMPLE II

A bauxite containing 23.29% of $SiO_2$ and 44.42% of $Al_2O_3$ is heated for one hour to a 1000° C. and subsequently stirred for a quarter of an hour with a 30% NaOH solution of a temperature of about 100° C. The residue is filtered off, the filtrate is regenerated by reaction with lime or the like and returned to the process. The residue obtained contains 8.9% of $SiO_2$ and 51.1% of $Al_2O_3$. After further treating this residue under otherwise similar conditions with an NaOH solution of about 10% concentration, a product is obtained which contains 4.3% of $SiO_2$ and 52.7% of $Al_2O_3$ which can be decomposed by the Bayer process with a yield of more than 90%.

The following table will show the results obtained by a series of further examples made according to the method of the invention, and by repeating Example I with different materials.

Table I

| Example No. | Bauxite—Starting Material | | Final Product | |
|---|---|---|---|---|
| | Percent SiO$_2$ | Percent Al$_2$O$_3$ | Percent SiO$_2$ | Percent Al$_2$O$_3$ |
| III | 10.72 | 57.33 | 2.31 | 63.60 |
| IV | 12.20 | 53.59 | 1.88 | 61.71 |
| V | 15.53 | 52.28 | 3.09 | 60.90 |
| VI | 18.90 | 51.30 | 2.69 | 58.30 |
| VII | 21.12 | 48.46 | 3.45 | 57.35 |
| VIII | 23.30 | 46.79 | 4.16 | 60.54 |
| IX | 24.53 | 45.13 | 2.94 | 58.30 |
| X | 26.92 | 45.28 | 4.26 | 59.45 |
| XI | 30.61 | 41.91 | 6.65 | 56.21 |

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A method for reducing the silica contents of alumina-containing materials of the bauxite type having a relatively high SiO$_2$-content of at least about 10% and wherein the aluminum content of said bauxite type is essentially alumina, and simultaneously increasing the content of alumina, comprising (a) calcining a bauxite having an SiO$_2$ content of at least about 10% and being free from additions of lime and soda at a temperature of about 900 to 1100° C. for about one hour, so as to convert a major portion of the SiO$_2$ present therein into soluble silicate, thereafter (b) dissolving said soluble silicate from the calcined material with a sodium hydroxide solution containing above 20% of sodium hydroxide at a temperature of between 70° C. to the boiling temperature of said solution and for a period of about fifteen to thirty minutes, thereby leaving undissolved a residue containing maximally 10% of SiO$_2$ and more than 50% of Al$_2$O$_3$, and then (c) separating the silicate-containing solution from the undissolved residue containing the aforesaid increased rate of alumina and the reduced rate of silica.

2. A method for reducing the silica contents of alumina-containing materials of the bauxite type having a relatively high SiO$_2$ content of at least about 10% and wherein the aluminum content of said bauxite type is essentially alumina, and simultaneously increasing the content of alumina, comprising (a) calcining a bauxite having an SiO$_2$ content of at least about 10% and being free from additions of lime and soda at a temperature of about 900 to 1100° C. for about one hour, so as to convert a major portion of the SiO$_2$ present therein into soluble silicate, thereafter (b) dissolving the major portion of said soluble silicate from the calcined material with a sodium hydroxide solution containing above 20% of sodium hydroxide at a temperature of between 70° C. to the boiling temperature of the solution and for a period of about fifteen to thirty minutes, thereby leaving undissolved a residue containing maximally 10% of SiO$_2$ and more than 50% of Al$_2$O$_3$, then (c) separating the silicate-containing solution from the undissolved residue containing the aforesaid increased rate of alumina and the reduced rate of silica, and (d) dissolving the portion of soluble silicate still retained in the separated residue by leaching out the latter with a sodium hydroxide solution containing from 2 to 10% of sodium hydroxide.

3. A method for reducing the silica contents of alumina-containing materials of the bauxite type having a relatively high SiO$_2$ content of at least about 10% and wherein the aluminum content of said bauxite type is essentially alumina, and simultaneously increasing the content of alumina, comprising (I) calcining a bauxite having an SiO$_2$ content of at least about 10% and being free from additions of lime and soda at a temperature of about 900 to 1100° C. for about one hour, so as to convert a major portion of the SiO$_2$ present therein into soluble silicate, thereafter (II) dissolving said soluble silicate from the calcined material with a sodium hydroxide solution containing above 20% of sodium hydroxide at a temperature of between 70° C. and the boiling temperature of the solution and for a period of about fifteen to thirty minutes, thereby leaving undissolved a residue containing maximally 10% of SiO$_2$ and more than 50% of Al$_2$O$_3$, then (III) separating the silicate-containing solution from the undissolved residue containing the aforesaid increased rate of alumina and the reduced rate of silica, and (IV) treating the separated silicate-containing solution with an alkali earth metal oxide hydrate so as to precipitate SiO$_2$ therefrom, and recycling the resulting caustic solution into stage (III).

4. A method for reducing the silica contents of alumina-containing materials of the bauxite type having a relatively high SiO$_2$ content of at least about 10% and wherein the aluminum content of said bauxite type is essentially alumina, and simultaneously increasing the content of alumina, comprising (a) calcining a bauxite having an SiO$_2$ content of at least about 10% and being free from additions of lime and soda at a temperature of about 1000° C. for about one hour, so as to convert a major portion of the SiO$_2$ present therein into soluble silicate, thereafter (b) dissolving said soluble silicate from the calcined material with a sodium hydroxide solution containing above 30% of sodium hydroxide at a temperature of between 70° C. to the boiling temperature of said solution and for a period of about fifteen to thirty minutes, thereby leaving undissolved a residue containing less than 5% of SiO$_2$ and more than about 60% of Al$_2$O$_3$, and then (c) separating the silicate-containing solution from the undissolved residue containing the aforesaid increased rate of alumina and the reduced rate of silica.

References Cited in the file of this patent

UNITED STATES PATENTS 1,971,354     Scheidt et al.     Aug. 28, 1934

FOREIGN PATENTS 552,583     Great Britain     Apr. 15, 1943

OTHER REFERENCES

U.S. Bureau of Mines Publication, R.I. 4462, June 1949, "Lime-Soda ... Tests," by Conley, John E., et al., pages 6, 10, 16, 17, 25, 26, 31.